(12) United States Patent
Pinera

(10) Patent No.: US 8,083,469 B1
(45) Date of Patent: Dec. 27, 2011

(54) HIGH TEMPERATURE BEARING WITH LUBRICANT

(75) Inventor: Alex Pinera, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 543 days.

(21) Appl. No.: 12/408,016

(22) Filed: Mar. 20, 2009

(51) Int. Cl.
F01D 11/00 (2006.01)

(52) U.S. Cl. ........ 415/113; 415/111; 415/229; 384/463; 384/476; 384/907; 184/6.11; 184/99

(58) Field of Classification Search ............... 415/110, 415/111, 180, 229, 113; 384/313, 397, 463, 384/468, 473, 476, 907; 184/6.11, 14.1, 184/45.1, 45.2, 98, 99
See application file for complete search history.

(56) References Cited

U.S. PATENT DOCUMENTS

| 4,381,824 A * | 5/1983 | Pastusek | 175/229 |
| 4,797,011 A * | 1/1989 | Saeki et al. | 384/13 |
| 5,080,195 A * | 1/1992 | Mizumoto et al. | 184/6.4 |
| 6,405,811 B1 * | 6/2002 | Borchardt | 175/337 |
| 2004/0202536 A1 * | 10/2004 | Macfadyen | 415/111 |

* cited by examiner

Primary Examiner — Matthew Landau
Assistant Examiner — Joseph C Nicely
(74) Attorney, Agent, or Firm — John Ryznic

(57) ABSTRACT

A bearing lubrication system for a high temperature bearing, such as in a small gas turbine engine for a UAV, in which the bearing and lubricant requires a long shelf life, where the bearing includes a solid lubricant movable within a chamber formed within a housing and located adjacent to the bearing. The solid lubricant is biased by a spring toward the bearing and abuts against a runner that rotates along with the rotor shaft during engine operation. A cooling air passage opens into a space formed between the bearing and the solid lubricant to supply cooling air through the bearing. When the engine operates, heat is transferred through the runner to the solid lubricant to melt the lubricant. Rubbing of the runner against the biased solid lubricant will also melt the lubricant. The melting lubricant is carried by the cooling air through the bearing to provide both cooling and lubrication for the bearing.

17 Claims, 1 Drawing Sheet

HIGH TEMPERATURE BEARING WITH LUBRICANT

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a small gas turbine engine, and more specifically to a lubricated bearing for the small gas turbine engine.

2. Description of the Related Art Including Information, Disclosed Under 37 CFR 1.97 and 1.98

A small gas turbine engine is used to power a small UAV (unmanned aero vehicle) because of the engine's high efficiency. The UAV can have much longer hover times because of the higher efficient gas turbine engine. Prior art UAVs are powered by small internal combustion engines or small single spool gas turbine engines.

The size and weight of the power plant used for a UAV is critical. Extra weight or space due to a larger engine reduces the space available for fuel. Less fuel results in lower hover times. Another issue to be addressed in a UAV is the shelf life of the engine or other parts that are required to fly the UAV. A military UAV must have a very long shelf life in order to be used by the military. Thus, liquids such as lubricants must be capable of being stored for these long shelf lives if the UAV is to be operated. Modern aero gas turbine engines include a bearing lubrication system that can form up to 17% of the weight of the engine. Prior art bearing lubrication systems includes parts like lubricant reservoir, pump, lubricant cooling system, and the necessary piping to deliver and collect the lubricant to cool the bearings. These parts add to the weight of the engine.

What is needed is a bearing lubrication system for a small gas turbine engine that will provide for a long shelf life, reduce the complexity and weight of the engine, and provide adequate lubrication and cooling for the bearing during engine use.

BRIEF SUMMARY OF THE INVENTION

It is an object of the present invention to provide for a small gas turbine engine that has a very long shelf life.

It is another object of the present invention to provide for a small gas turbine engine that has reduced weight than the prior art gas turbine engines.

It is another object of the present invention to provide for a small gas turbine engine that includes a bearing lubrication system that does not require a lubricant pump, a lubricant reservoir, a lubricant cooling device and a lubricant piping system to supply and collect the lubricant for lubricating the bearing.

The above objectives and more are achieved with the bearing lubrication system for a small gas turbine engine of the present invention which includes a solid lubricant that has a very long shelf life enclosed within a chamber located adjacent to a bearing that requires lubrication. The solid lubricant is biased by a spring toward the bearing. The solid lubricant is held in place against the bias of the spring by a runner secured to the rotor shaft in which the runner is made from a high melting temperature alloy. When the engine is started, heat from the engine operation and frictional heat generated from rubbing contact will flow through the runner and start to melt the solid lubricant. Cooling air passing following through the bearing will carry the melting lubricant toward the bearing to provide for both lubrication and cooling of the bearing. The size of the solid lubricant is enough for at least one mission of the aircraft that is powered by the gas turbine engine.

DETAILED DESCRIPTION OF THE INVENTION

Figure 1:
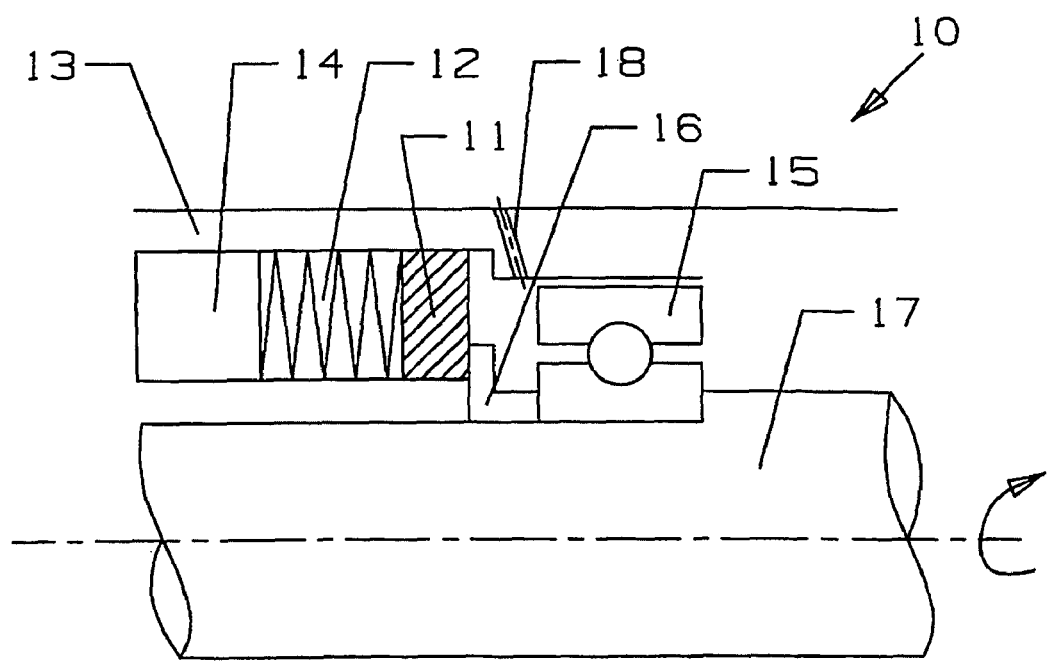
FIG. 1 shows a cross section view of the bearing lubrication system of the present invention.

The bearing lubrication system of the present invention is intended for use in a small gas turbine engine that powers a small UAV in which the engine and UAV parts must have a long shelf life. However, the long shelf life bearing lubrication system can be used in other apparatus's which require bearing lubrication and less weight for the engine. The bearing lubrication system 10 in FIG. 1 includes a bearing 15 on a rotor shaft 17, which in this embodiment is a rotor shaft for a small gas turbine engine. The bearing can be a roller bearing or a ball bearing. The bearing 15 and rotor shaft 17 is mounted within a housing 13 that also forms a chamber with an opening that faces the bearing 15. The chamber includes a solid lubricant 11 that has a very long shelf life, meaning that the lubricant will not degrade with time but still produce its intended lubrication capability. The solid lubricant 11 is biased by a spring 12 within the chamber. A nut or retainer 14 is located against the opposite side of the spring 12. A cooling air supply passage 18 is formed within the housing 13 and opens into the space in which the bearing operates between the lubricant and the bearing and delivers cooling air to the bearing which flows through the bearing to provide cooling. A runner 16 that is secured to the rotor shaft 17 and rotates with the shaft forms an abutment surface for the solid lubricant 11. When the shaft 17 rotates, the runner 16 will also rotate and rub against the contact point on the lubricant 11. The runner 16 is made from a high melting temperature alloy.

The solid lubricant 11 remains biased up against the runner 16 while sitting on the shelf waiting to be used when the engine is started and operated. When the engine is started, the heat from operation will heat up the runner 16. As the runner heats up, the solid lubricant 11 will start to melt. The rubbing of the runner 16 against the solid lubricant 11 and the heat transfer from the runner 16 to the lubricant 11 will melt the lubricant 11. The cooling air flowing through the passage 18 and through the bearing 15 will pick up the lubricant as it melts and pass the lubricant through the bearing to produce both cooling and lubrication of the bearing. The spring 12 will bias the solid lubricant 11 against the runner 16 during the entire engine operation and provide full bearing lubrication and cooling for the mission. When the mission is over and the UAV can be re-used, the unused solid lubricant is removed and replaced with a new solid lubricant for the next mission.

Since the solid lubricant is located adjacent to the rotor shaft and the bearing, and since the bearing is located near to the turbine which is exposed to very high temperatures, the solid lubricant must be a high temperature lubricant. Other features not shown can be used to increase the flow of the lubricant through the bearing along with the cooling air. The cooling air can be directed to impinge directly onto the solid lubricant to carry away the melting lubricant is desired.

I claim the following:

1. A gas turbine engine comprising:
    a rotor shaft connected to a turbine that is exposed to a hot gas flow to drive the engine;
    a bearing secured within a housing of the engine to rotatably support the rotor shaft;
    a cooling air supply passage in the housing to deliver cooling air to the bearing;
    a solid lubricant moveable within a chamber of the housing;
    a runner rotatably secured to the rotor shaft and located adjacent to the bearing, the runner abutting against the solid lubricant; and,
    a spring to bias the solid lubricant against the runner.

2. The gas turbine engine of claim 1, and further comprising:
    the solid lubricant has along shelf life.

3. The gas turbine engine of claim 1, and further comprising:
    the solid lubricant is positioned close enough to the bearing that the cooling air flowing through the bearing will carry lubricant through the bearing as the solid lubricant melts.

4. The gas turbine engine of claim 1, and further comprising:
    the solid lubricant is a high temperature lubricant that remains solid as it is exposed to the engine operating temperature but melts as it is exposed to rubbing or heat transfer form the runner.

5. The gas turbine engine of claim 1, and further comprising:
    the runner is made from a high melting temperature alloy.

6. The gas turbine engine of claim 1, and further comprising:
    the solid lubricant is enough for at least one mission of the engine but less than two missions.

7. The gas turbine engine of claim 1, and further comprising:
    the runner rubs against the solid lubricant when the engine is operating; and,
    the solid lubricant remains stationary within the chamber of the housing.

8. A high temperature bearing and lubrication system comprising:
    a bearing secured within a housing and rotatably supporting a rotor shaft;
    a source of heat that heats up the rotor shaft and requires that the bearing be cooled and lubricated;
    a solid high temperature resistant lubricant movable within a chamber of the housing and located adjacent to the bearing;
    a cooling air supply passage in the housing that opens into a space between the bearing and the solid lubricant;
    a spring to bias the solid lubricant toward the bearing; and,
    a runner rotatably secured to the rotor shaft and securing the solid lubricant against movement due to the bias of the spring, wherein rotation of the rotor shaft causes the runner to rub against the solid lubricant so that the solid lubricant begins to melt so that the cooling air passing through the bearing will pick up the lubricant to provide lubrication to the bearing.

9. The high temperature bearing and lubrication system of claim 8, and further comprising:
    the solid lubricant has a long shelf life.

10. The high temperature bearing and lubrication system of claim 9, and further comprising:
    the solid lubricant is positioned close enough to the bearing that the cooling air flowing through the bearing will carry lubricant through the bearing as the solid lubricant melts.

11. The high temperature bearing and lubrication system of claim 9, and further comprising:
    the solid lubricant is a high temperature lubricant that remains solid as it is exposed to the engine operating temperature but melts as it is exposed to rubbing or heat transfer form the runner.

12. The high temperature bearing and lubrication system of claim 9, and further comprising:
    the runner is made from a high melting temperature alloy.

13. The high temperature bearing and lubrication system of claim 9, and further comprising:
    the solid lubricant is enough for at least one mission of the bearing but less than two missions.

14. A process for lubricating a bearing used in a small gas turbine engine comprising the steps of:
    securing a runner onto a rotor shaft of the engine;
    biasing a solid lubricant against the runner in which the solid lubricant does not rotate;
    operating the engine such that the solid lubricant starts to melt; and,
    passing cooling air through the bearing so that the cooling air carries away the melting lubricant and through the bearing to provide cooling and lubrication for the bearing.

15. The process for lubricating a bearing of claim 14, and further comprising the step of:
    rubbing the runner against the biased lubricant to melt the solid lubricant while the engine is operating.

16. The process for lubricating a bearing of claim 14, and further comprising the step of:
    sizing the solid lubricant so that at least one mission of the engine can be operated with the bearing being lubricated during the mission.

17. The process for lubricating a bearing of claim 14, and further comprising the step of:
    forming the runner out of a high melting temperature allow so that heat from operating the engine will transfer through the runner and into the solid lubricant to melt the solid lubricant.

* * * * *